United States Patent [19]

Uno et al.

[11] Patent Number: 5,699,200
[45] Date of Patent: Dec. 16, 1997

[54] LENS ASSEMBLY WHICH ZOOMS BY COMBINED MOVEMENT OF PLURAL BARRELS

[75] Inventors: Tetsuya Uno, Sakai; Yoshifumi Harada, Hashimoto; Daigo Yoshioka, Toyonaka; Hiroaki Hasegawa, Sakai; Yasuo Hawai, Higashiosaka, all of Japan

[73] Assignee: Minolta Co., Ltd., Osaka, Japan

[21] Appl. No.: 689,005

[22] Filed: Jul. 30, 1996

Related U.S. Application Data

[63] Continuation of Ser. No. 490,151, Jun. 14, 1995, abandoned.

[30] Foreign Application Priority Data

Jun. 15, 1994 [JP] Japan .................. 6-132997

[51] Int. Cl.$^6$ .................. G02B 15/14; G02B 7/02
[52] U.S. Cl. .................. 359/700; 359/699; 359/703; 359/819
[58] Field of Search .................. 359/700, 811, 359/699, 701, 703, 704, 819, 813, 818, 694, 695, 696, 831; 353/24, 96, 100, 101; 354/286; 362/455

[56] References Cited

U.S. PATENT DOCUMENTS

| | | | |
|---|---|---|---|
| 2,596,665 | 5/1952 | Eagle | 359/811 |
| 5,016,993 | 5/1991 | Akitake | 359/696 |
| 5,166,829 | 11/1992 | Iizuka | 359/699 |
| 5,461,444 | 10/1995 | Okura | 354/286 |

FOREIGN PATENT DOCUMENTS

| | | |
|---|---|---|
| Hei 2-201307 | 8/1990 | Japan . |
| Hei 4-52725 | 12/1992 | Japan . |

*Primary Examiner*—David C. Nelms
*Assistant Examiner*—Ricky Mack
*Attorney, Agent, or Firm*—Burns, Doane, Swecker & Mathis, LLP

[57] ABSTRACT

A lens assembly is disclosed in which the amount of movement of at least one lens unit is achieved by combining the amounts of relative movement of at least two barrels. A linear advancement barrel advances straight ahead relative to a fixed barrel. A first lens unit moves together with the linear advancement barrel. A second lens unit is located in front of the first lens unit along the optical axis. A third lens unit is located behind the first lens unit along the optical axis. A cam ring moves together with the linear advancement barrel along the optical axis and rotates around the optical axis. The cam ring has first and second cams that move the second lens unit and the third lens unit by amounts of movement relative to the linear advancement barrel.

20 Claims, 13 Drawing Sheets

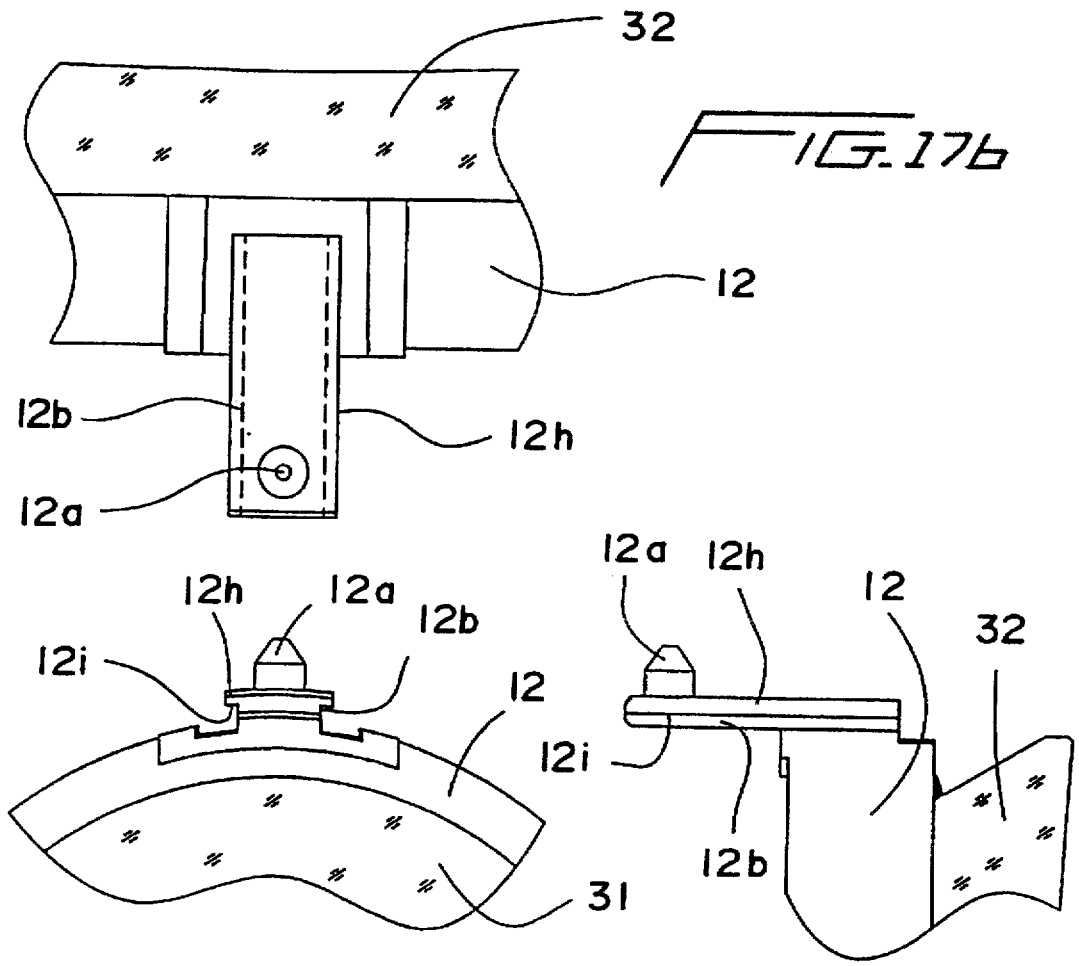
FIG. 17b
FIG. 17a
FIG. 17c
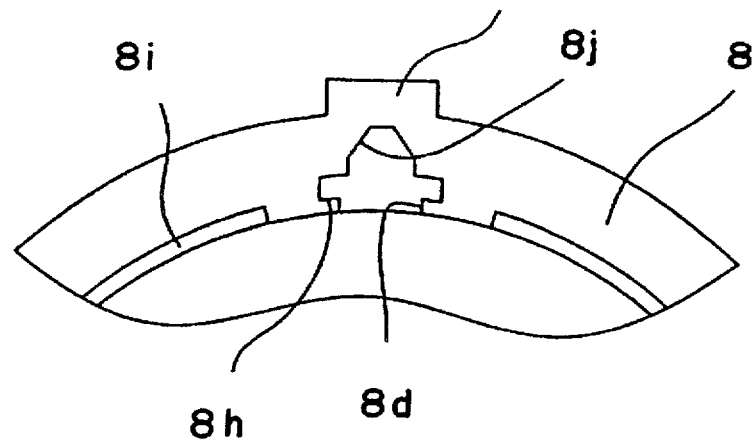
FIG. 17d

LENS ASSEMBLY WHICH ZOOMS BY COMBINED MOVEMENT OF PLURAL BARRELS

This application is a continuation of application Ser. No. 08/490,151, filed Jun. 14, 1995, now abandoned.

FIELD OF THE INVENTION

The present invention relates to a lens assembly of the type used in a camera or the like, and more particularly, to a lens assembly used in a lens structure, such as a zoom lens.

BACKGROUND OF THE INVENTION

Lens assemblies have been proposed in which cams, helicoids or leads are formed on each of multiple barrels, such that the amounts of movement of lens units may be attained by combining the relative amounts of movement of multiple barrels. For example, in a zoom lens assembly, the movement for each lens unit is attained by combining an amount of movement of a cam ring relative to a fixed barrel, together with the amount of movement of each lens unit relative to the cam ring. To achieve this movement, helicoids that cause the cam ring to rotate and advance forward are formed on a fixed barrel, and the cam ring has cams for each of the lens units in the same number as the lens units.

In this conventional type of lens assembly, it is necessary to form cams for all lens units on the cam ring. In the case of a three component-type lens assembly in which there are three lens units, the barrel's outer diameter or length must be increased in order to accommodate the cams. To describe this concept in more detail, in the case of a three component-type lens assembly, if the cams for the first lens unit, the second lens unit and the third lens unit are to be formed on one cam ring, three cams for each respective lens unit, or a total of nine cams, must be formed in one barrel. This requirement is imposed to guarantee the position of the lens along the optical axis as well as its tilt relative to the optical axis, regardless of where the moving element (lens unit) is located, by restricting three points along the circumference of the moving element. Reducing the number of cams in order to increase the degree of freedom in the arrangement of the lens assembly leads to reduced precision, which is undesirable. Naturally, it is conceivable to reduce the angle of rotation of the cam ring in order to increase the degree of freedom in the lens assembly arrangement. However, this increases the cam pressure angle as well as the drive torque, which is also undesirable.

In summary, where the cams for the first, second and third lens units are formed on one cam ring, the outer diameter or length of the cam ring must be relatively large, consequently preventing the lens assembly from being compact. The present invention was made in consideration of this problem. Its object is to provide a compact and high precision lens assembly, capable of supporting and driving a lens having three or more components, in which the drive torque is not increased over a conventional lens assembly.

SUMMARY OF THE INVENTION

To achieve this objective, the lens assembly of the present invention has at least two barrels which have cams, helicoids or leads to achieve movement of at least one lens unit by combining the amounts of relative movement of the two barrels. The lens assembly includes a linear advancement barrel that advances linearly ahead relative to a fixed item, and a first lens unit that moves together with the linear advancement barrel during a zooming operation or the like. A second lens unit is located in front of the first lens unit along the optical axis, and a third lens unit is located behind the first lens unit along the optical axis. A cam ring moves together with the linear advancement barrel along the optical axis and rotates around the optical axis. The cam ring has first and second cams that move the second lens unit and third lens unit by amounts of movement relative to the linear advancement barrel.

With this construction, in the case of a three component-type lens assembly in which there are three lens units, only cams for two lens units need to be formed on the cam ring, and it is no longer necessary to form cams for all three of the lens units. In other words, only six cams need to be formed on the cam ring, similar to the case of a two component-type lens assembly.

BRIEF DESCRIPTION OF THE DRAWINGS

FIGS. 17a–d are a front elevation, a rear elevation, a side elevation, and a side elevation, respectively, of a cam follower and a guide of the embodiment shown in FIG. 1.

DETAILED DESCRIPTION

Figure 1:
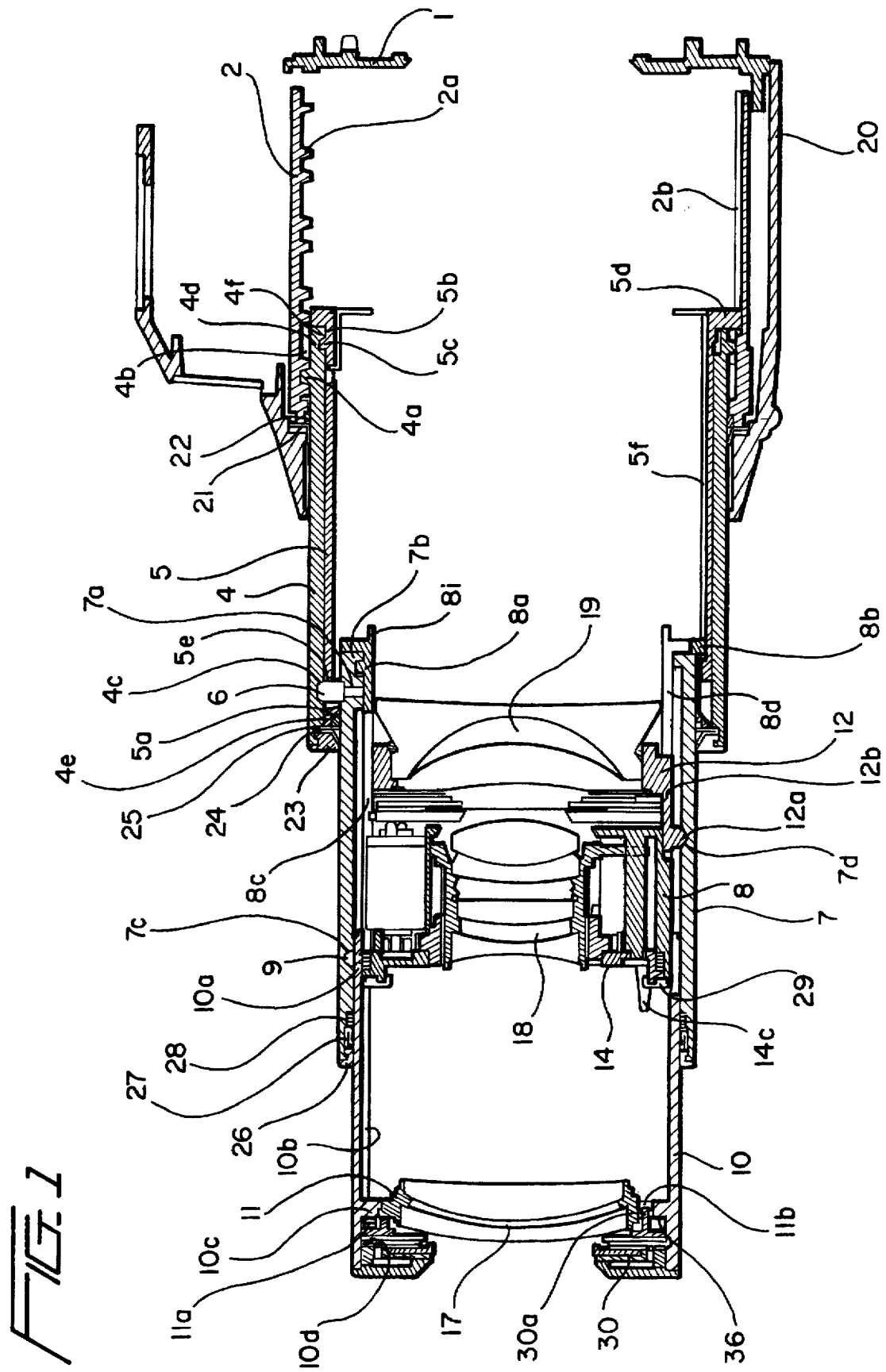
FIG. 1 is a sectional side elevation of a zoom lens assembly of a first embodiment of the present invention, in which the zoom lens assembly is in the longest focal length condition.

To provide an overview, the entire construction of a zoom lens is first explained with reference to FIGS. 1 through 6. A camera body 1 has a barrel 2 which is fixed to the camera body 1. The barrel 2 has female helicoids 2a and linear advancement grooves 2b on its interior surface. Referring to FIG. 4, an elongated gear 3, rotatably located on the fixed barrel 2, transmits a rotational force along the fixed barrel 2. This rotational force can be transmitted from zoom reduction gears which are not shown in the drawings. A rotating advancement barrel 4 has male helicoids 4a which engage the female helicoids 2a of the fixed barrel 2 and a gear 4b which engages the elongated gear 3. It is equipped with tapered cams 4c, bayonets 4d and diametral engagement members 4e and 4f. A first linear advancement barrel 5 has engagement members 5a and 5b which engage with the diametral engagement members 4e and 4f of the rotating advancement barrel 4, bayonet claws 5c which engage with the bayonets 4d of the rotating advancement barrel 4, and linear advancement ribs 5d which engage with the linear advancement grooves 2b of the fixed barrel 2. It is equipped with cam holes 5e and inner surface linear advancement grooves 5f.

A first set of cam followers 6 engage the tapered cams 4c of the rotating advancement barrel 4 and the cam holes 5e of the first linear advancement barrel 5. They are fixed to a cam ring 7. The cam ring 7 has fixing members 7a for the first cam followers 6. It also has internal bayonets 7b, as well as first lens unit tapered cams 7c and third lens unit tapered cams 7d. A second linear advancement barrel 8 has bayonet claws 8a which engage the bayonets 7b of the cam ring 7. It is equipped with linear advancement ribs 8b which engage the inner surface of linear advancement grooves 5f of the first linear advancement barrel 5, first lens unit linear advancement guides 8c and third lens unit linear advancement guides 8d which guide a first lens unit lens barrel 10 and a third lens unit lens holder 12 in a straight-ahead fashion, respectively. The second linear advancement barrel 8 also has third lens unit lens holder receivers 8i (see FIG. 5) which support the third lens unit lens holder 12 around its circumference in the shortest focal length condition. The second linear advancement barrel 8 supports the focusing unit described below as one unit, and also supports as one unit the second lens unit lenses 18 described below, which comprise the focusing lens system, during zooming.

A second set of cam followers 9 engage the first lens unit tapered cams 7c of the cam ring 7 and are fixed to the first lens unit lens barrel 10. The first lens unit lens barrel 10 has fixing members 10a for the second set of cam followers 9 and engagement members 10b which engage the first lens unit linear advancement guides 8c of the second linear advancement barrel 8. It also includes fixing members 10c for the first lens unit lens holder 11 and a housing member 10d for a barrier unit 30. The first lens unit lens holder 11 has connecting members 11a which connect with fixing members 10c of the first lens unit lens barrel 10 and escape holes 11b through which barrier driving cams 14c of a focusing platform 14 and the cams of a barrier operating ring 30a of a barrier unit 30 come into contact when the barrier is operated. It supports first lens unit lenses 17 on its interior edges. A third lens unit lens holder 12 has cam followers 12a which engage the third lens unit tapered cams 7d of the cam ring 7 and linear advancement keys 12b which engage the third lens unit linear advancement guides 8d of the second linear advancement barrel 8. A focusing platform 14 is connected to the second linear advancement barrel 8 and is equipped with three barrier driving cams 14c which engage the barrier unit 30.

A front cover 20 covers the front of the camera, and a first shielding ring 21 located in the space made by front cover 20, the fixed barrel 2 and the rotating advancement barrel 4 prevents light from entering the zoom lens assembly from the gap between the front cover 20 and the rotating advancement barrel 4. A first ring 22 with flocked fabric is fixed to the fixed barrel 2 for the same purpose as the first shielding ring 21. A first cap ring 23 is fixed to the rotating advancement barrel 4 to prevent light from entering the zoom lens assembly from the gaps between the rotating advancement barrel 4 and the first linear advancement barrel 5, and between the first linear advancement barrel 5 and the cam ring 7, respectively. It also hides from external view a second shielding ring 24 and a second ring with flocked fabric 25.

The second shielding ring 24 is located in the space made by the first cap ring 23, the rotating advancement barrel 4, the first linear advancement barrel 5 and the cam ring 7, and prevents light from entering the zoom lens assembly from the gap between the first linear advancement barrel 5 and the cam ring 7. The second ring 25 with flocked fabric is fixed to the first linear advancement barrel 5 for the same purpose as the second shielding ring 24. A second cap ring 26 is fixed to the cam ring 7 to prevent light from entering the zoom lens assembly from the gap between the cam ring 7 and the first lens unit lens barrel 10. It also hides from external view a rubber ring 27 and a third ring with flocked fabric 28. The shielding rubber ring 27 is fixed to the cam ring 7 to prevent light from entering the zoom lens assembly from the gap between the cam ring 7 and the first lens unit lens barrel 10. The third ring 28 with flocked fabric is fixed to the first linear advancement barrel 5 for the same purpose as the shielding rubber ring 27.

A rubber shielding member 29 prevents light passing through the first lens unit lenses 17 from reaching the film surface via the gap between the inner surface of the first lens unit lens barrel 10 and the circumference of the focusing platform 14 and then passing around the focusing block 8e of the second linear advancement barrel 8. It is fixed to the circumference of the focusing platform 14 and connected to the focusing block 8e of the second linear advancement barrel 8. The barrier unit 30 is equipped with a barrier operating ring 30a having three cams which engage each of the three barrier driving cams 14c of the focusing platform 14, respectively. A rubber shielding sheet 36 has three cuts, which are as small as possible to allow for engagement between the barrier driving cams 14c of the focusing platform 14 and the cams of the barrier operating ling 30a of barrier unit 30 when the barrier is operated, so that light and dust do not unnecessarily enter from escape holes 11b of the first lens unit lens holder 11.

Figure 7:
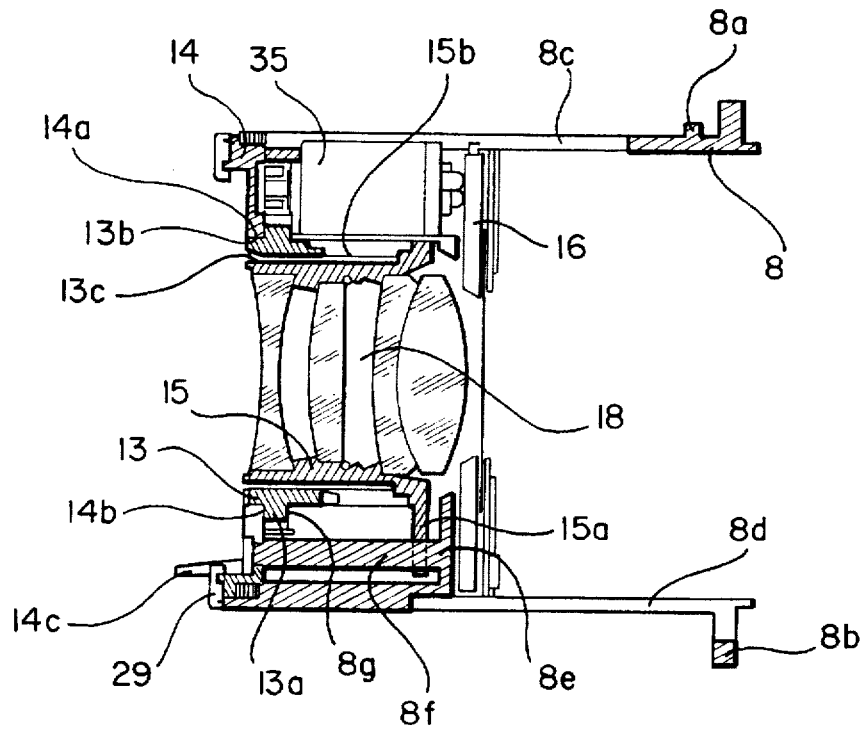
FIG. 7 is a sectional side elevation of the focusing lens supporting unit shown in FIG. 6.

The construction pertaining to focusing is explained with reference to FIG. 7. Focusing block 8e is constructed inside the second linear advancement barrel 8 as one unit. Linear advancement guides 8f engage a second lens unit lens holder 15, and contact surface 8g engages female helicoids 13 inside the focusing block 8e of the second linear advancement barrel 8. A female helicoid unit 13 having a flange 13a is sandwiched between the contact surface 8g of the second linear advancement barrel 8 and the focusing platform 14, and has a diametral engaging member 13b. It is equipped with female helicoids 13c on its inner surface. A focusing platform 14 has a diametral engaging member 14a which engages with the diametral engaging member 13b of the female helicoid unit 13, and a contact member 14b which comes into contact with the flange 13a of female helicoid unit 13. It is connected to the focusing block 8e of the second linear advancement barrel 8. The focusing platform 14 is equipped with three barrier driving cams 14c which engage with a barrier unit 30. A second lens unit lens holder 15, which supports the second lens unit lenses 18, has linear advancement guides 15a which engage the linear advancement guides 8f of the second linear advancement barrel 8, and male helicoids 15b which engage female helicoids 13c of the female helicoid unit 13.

A shutter unit 16 is connected to the focusing block 8e of the second linear advancement barrel 8.

The construction of the third lens unit lens holder 12 and the third lens unit lenses 19 are explained in more detail with reference to FIG. 8. The third lens unit lens holder 12 has a front engaging member 12c, a rear engaging member 12d, a contact surface 12e for determining lens position along the optical axis, and adhesion members 12f and 12g. The third lens unit lenses 19 comprise a third lens unit front lens 31 and a third lens unit rear lens 32. The third lens unit front lens 31 is equipped with an adhesion member 31a, a contact member 31b and an engaging member 31c, while the third lens unit rear lens 32 is equipped with a notch 32a used for adhesion, a front end surface 32b and a diametral engaging member 32c. The third lens unit rear lens 32 is fixed to the third lens unit lens holder 12 by an engaging member 32c, which engages with the rear engaging member 12d of the third lens unit lens holder 12. A front end surface 32b comes into contact with the contact surface 12e of the third lens unit lens holder 12. An adhesive 33 is applied between the adhesion member 12g of the third lens unit lens holder 12 and the notch 32a. The third lens unit front lens 31 is fixed to the third lens unit lens holder 12 by engagement of the engaging member 31c with the front engaging member 12c of third lens unit lens holder 12. The contact member 31b comes into contact with the front end surface 32b of the third lens unit rear lens 32. An adhesive 34 is applied between the adhesion member 12f of the third lens unit lens holder 12 and the adhesion member 31a.

The zoom operation will now be explained with reference to FIGS. 1 through 6. When the zooming motor (not shown in the drawings) operates with the lens in the state shown in FIG. 2 or 3, its rotational force is transmitted to the elongated gear 3 through reduction gears (not shown in the drawings), and the elongated gear 3 starts to rotate. Because long gear 3 is engaged with gear 4b of rotating advancement barrel 4 as described above, the rotational force is transmitted to rotating advancement barrel 4 as well. Male helicoids 4a of rotating advancement barrel 4 are engaged with female helicoids 2a of fixed barrel 2, and consequently when the rotational force is transmitted as described above, rotating advancement barrel 4 advances forward along the optical axis while rotating relative to fixed barrel 2. Bayonet claws 5c of the first linear advancement barrel 5 are engaged with bayonets 4d of rotating advancement barrel 4, and linear advancement ribs 5d are engaged with linear advancement grooves 2b on the inner surface of fixed barrel 2, as a result of which the linear advancement barrel 5 advances straight ahead along the optical axis, together with rotating advancement barrel 4 as rotating advancement barrel 4 advances forward along the optical axis.

The first cam followers 6 fixed to fixing members 7a of cam ring 7 are engaged with tapered cams 4c on the inner surface of rotating advancement barrel 4 and cam holes 5e of the linear advancement barrel 5, as a result of which when rotating advancement barrel 4 and linear advancement barrel 5 rotate relative to each other, cam ring 7 advances forward while rotating relative to linear advancement barrel 5. Bayonet claws 8a of the second linear advancement barrel 8 are engaged with bayonets 7b of cam ring 7, and linear advancement ribs 8b are engaged with linear advancement grooves 5f on the inner surface of the first linear advancement barrel 5, as a result of which the second linear advancement barrel 8 advances straight ahead along the optical axis together with cam ring 7, as cam ring 7 advances forward along the optical axis while rotating. Since focusing block 8e inside linear advancement barrel 8 is engaged with second lens unit lens holder 15 via female helicoid unit 13, second lens unit lens holder 15 advances straight ahead together with linear advancement barrel 8 along the optical axis via the zooming operation.

The second cam followers 9 fixed to fixing members 10a of first lens unit lens barrel 10 are engaged with first lens unit tapered cams 7c on the inner surface of cam ring 7 and engaging members 10b are engaged with first lens unit linear advancement guides 8c of the second linear advancement barrel 8, and consequently when cam ring 7 and linear advancement barrel 8 rotate relative to each other, first lens unit lens barrel 10 advances straight ahead relative to linear advancement barrel 8. Because first lens unit lens holder 11 is fixed to first lens unit lens barrel 10, it moves as a single unit with first lens unit lens barrel 10. Third lens unit lens holder 12 is connected with cam ring 7 and the second linear advancement barrel 8 by the same means as first lens unit lens barrel 10: cam followers 12a are engaged with third lens unit tapered cams 7d on the inner surface of cam ring 7, and linear advancement keys 12b are engaged with linear advancement guides 8d of the second linear advancement barrel 8, as a result of which cam ring 7 and linear advancement barrel 8 rotate relative to each other and third lens unit lens holder 12 advances straight ahead relative to linear advancement barrel 8.

Figure 2:
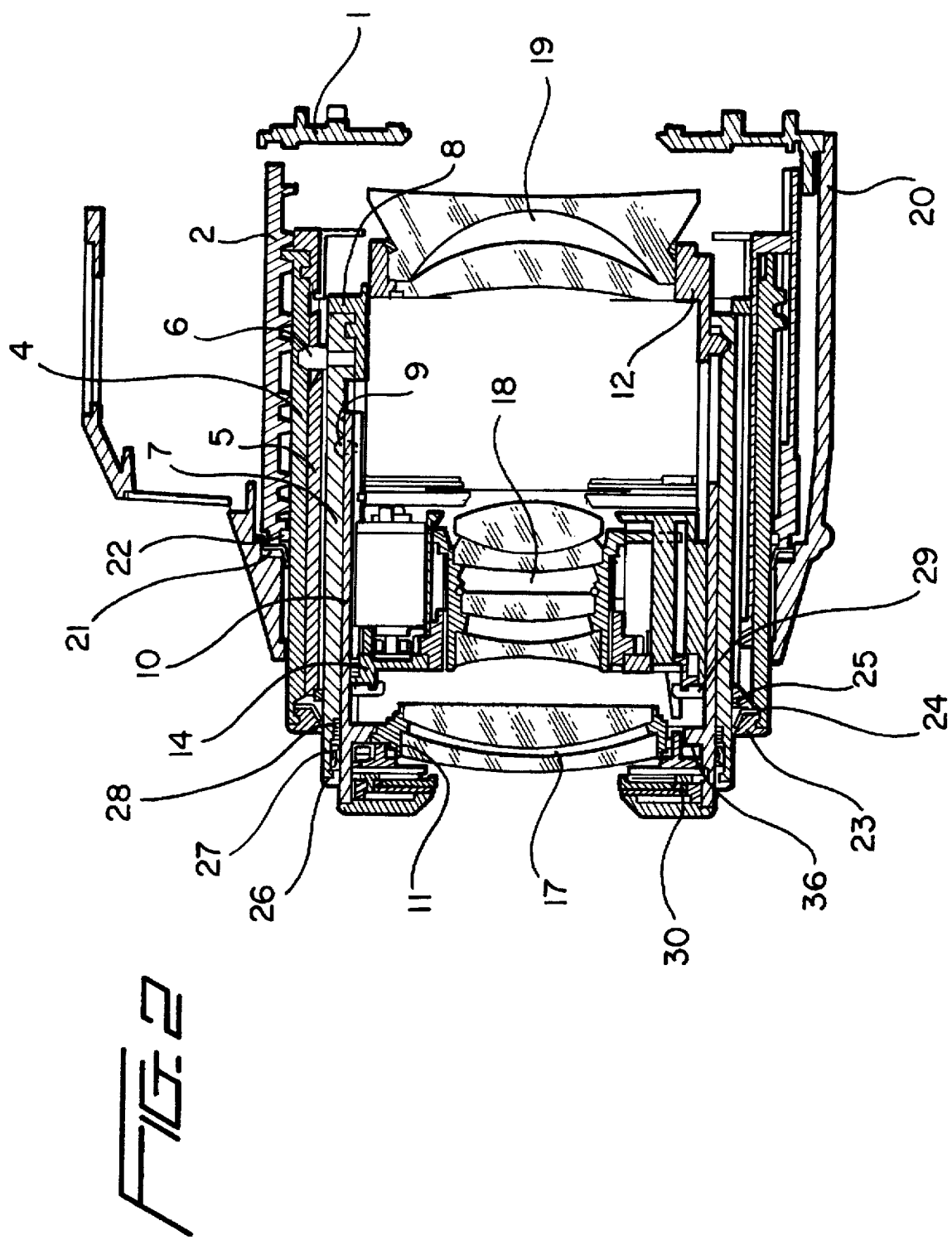
FIG. 2 is a sectional side elevation of the zoom lens assembly of the embodiment shown in FIG. 1, in which the zoom lens assembly is in the shortest focal length condition.
Figure 3:
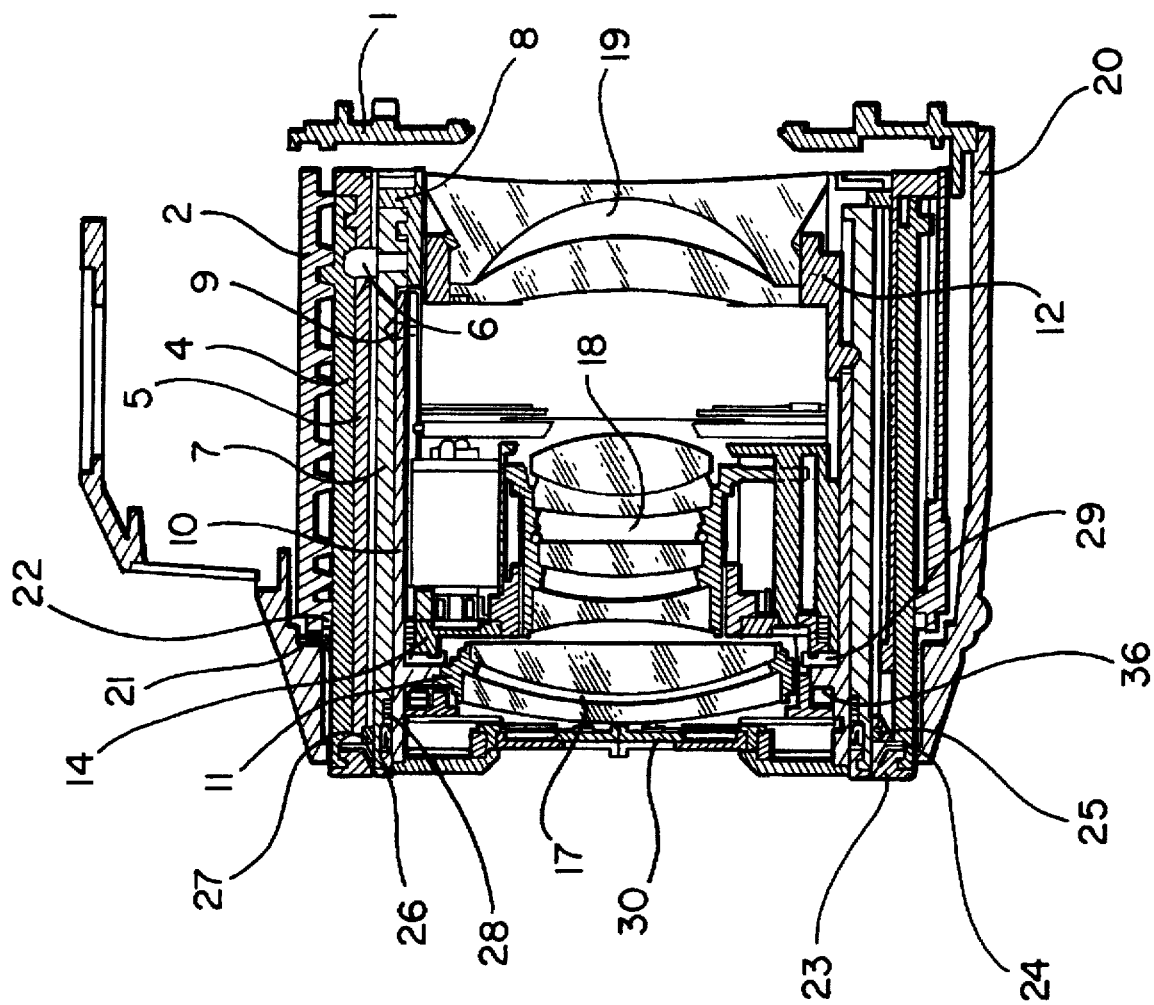
FIG. 3 is a sectional side elevation of the zoom lens assembly of the embodiment shown in FIG. 1, in which the zoom lens assembly is in a retracted storage position.
Figure 4:
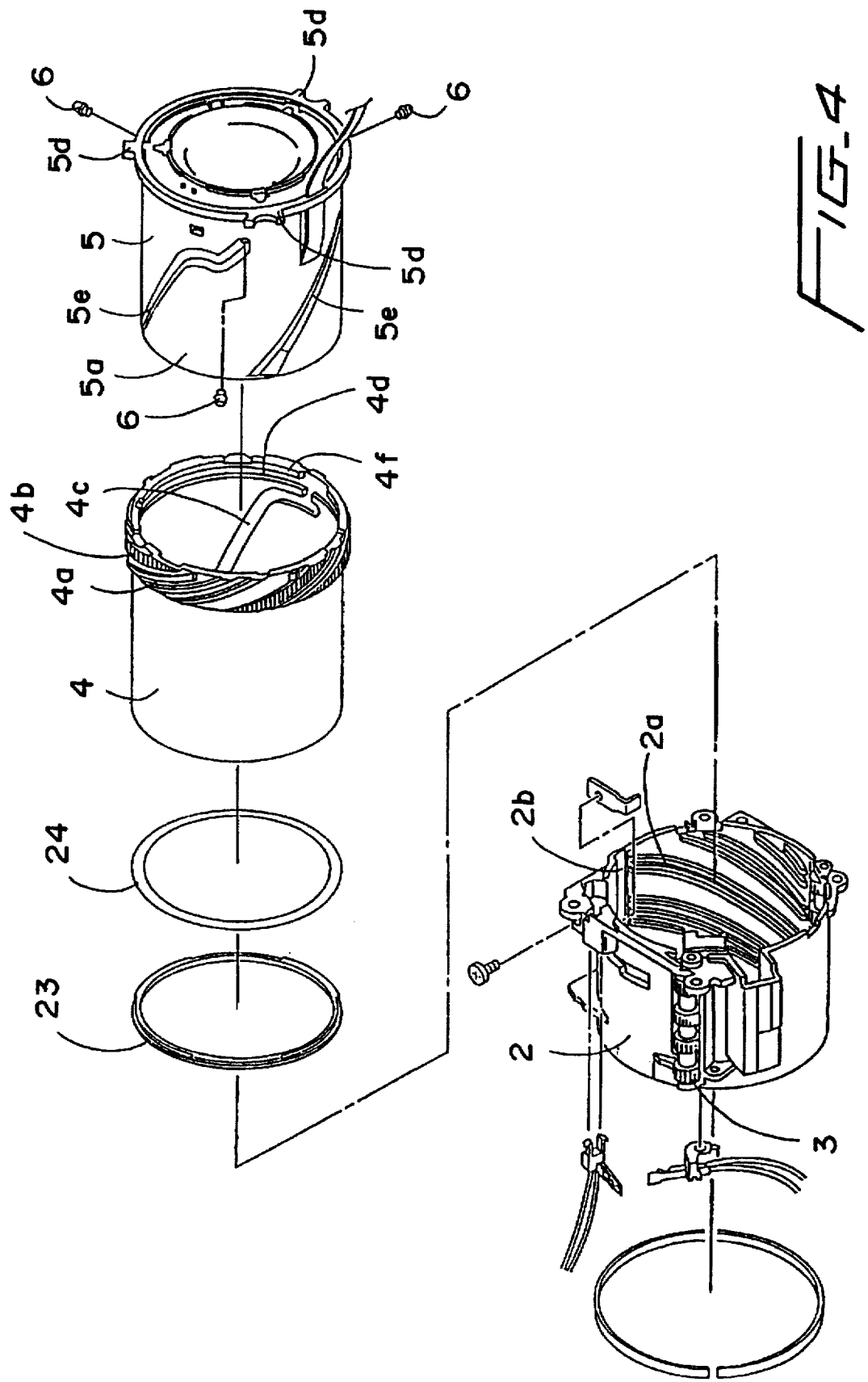
FIG. 4 is an exploded perspective view of the rear part of the zoom lens assembly of the embodiment shown in FIG. 1.
Figure 5:
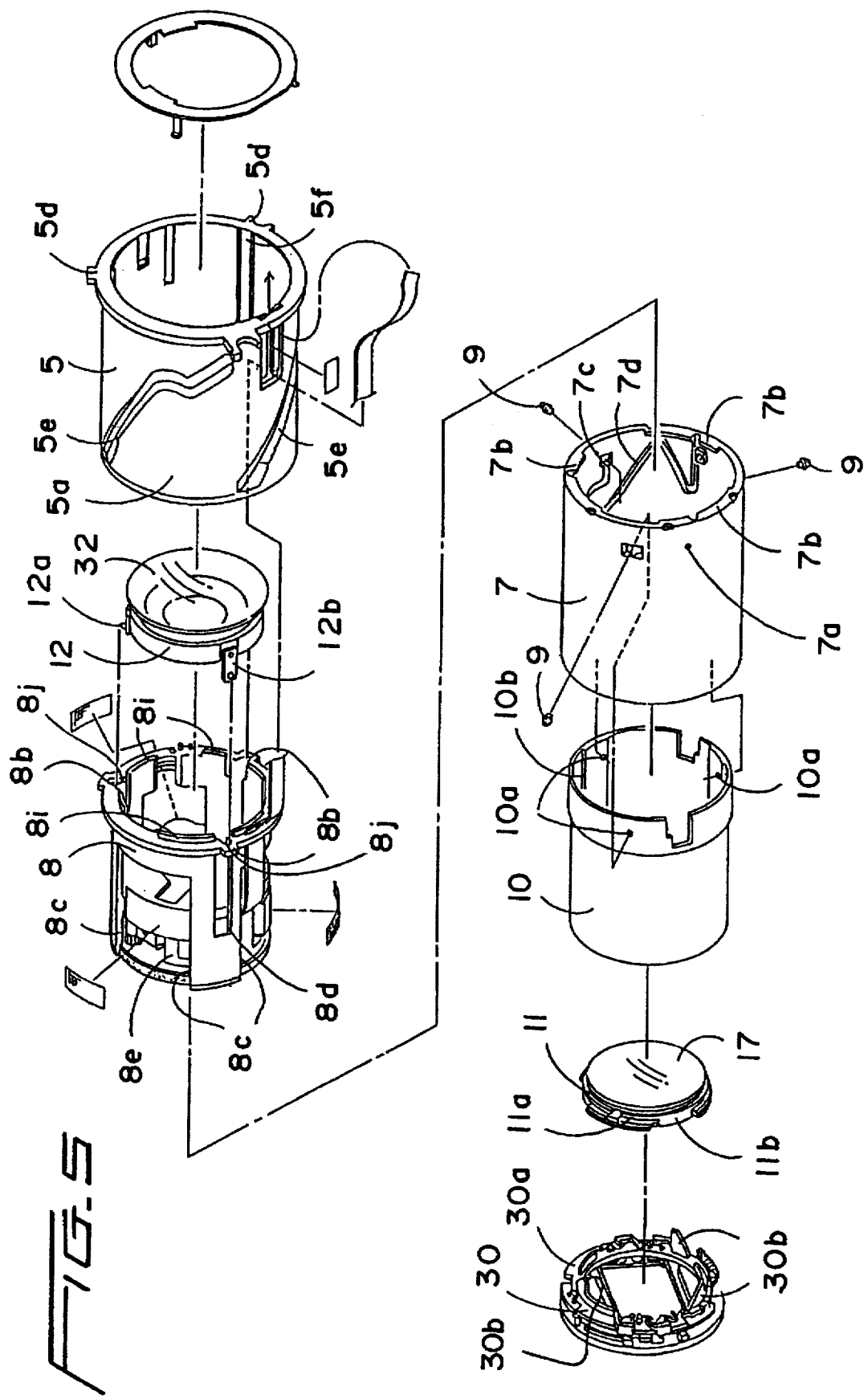
FIG. 5 is an exploded perspective view of the front part of the zoom lens assembly of the embodiment shown in FIG. 1.

In the zoom lens assembly of this embodiment, when photo-taking is not taking place (when the camera is being carried) as shown in FIG. 3, each lens unit may be moved to positions further into the camera body from the shortest focal length positions shown in FIG. 2, in order to reduce the depth of the camera. The lens units continuously move from the inside-the-camera positions to the shortest focal length positions and from the shortest focal length positions to the longest focal length positions (see FIG. 1) by means of the foregoing operations.

The focusing operation will now be explained referring to FIG. 7. When the focusing motor 35 rotates, its rotational force is transmitted to female helicoid unit 13 via reduction gears (not shown in the drawing). When female helicoid unit 13 rotates, second lens unit lens holder 15, which supports the focusing lens system, advances straight ahead relative to the second linear advancement barrel 8 because male helicoids 15b around second lens unit lens holder 15 are engaged with helicoids 13c inside female helicoid unit 13 and linear advancement guides 15a are engaged with linear advancement guides 8f of the second linear advancement barrel 8.

The zooming and focusing operations are as described above. The advantageous characteristics of this arrangement are described in detail below.

The first characteristic has to do with the cam construction of each barrel of the zoom lens assembly. As explained in connection with the zooming operation, in this embodiment, during zooming the second lens unit lens holder 15 moves together with the second linear advancement barrel 8, which moves by means of female helicoids 2a of fixed barrel 2 and cam holes 5e of the first linear advancement barrel 5. First lens unit lens barrel 10, to which first lens unit lens holder 11 is fixed, and third lens unit lens holder 12 move relative to the first linear advancement barrel 5, or in other words the second lens unit lens holder, by means of first lens unit tapered cams 7c and third lens unit tapered cams 7d on the inner surface of cam ring 7 which can rotate around the optical axis relative to the first linear advancement barrel 5. As a result of this construction, in spite of being a three component-type zoom lens in which there are three lens units, cam ring 7 has only two sets of three cams, or a total of six cams, and as a result the outer diameter and length of cam ring 7 may be reduced to the same number as a cam ring used in a two component-type zoom lens. Consequently, the outer diameter and length of the zoom lens assembly may be reduced to the same sizes as a zoom lens assembly used in a two component-type zoom lens. In addition, because the construction is such that second lens unit lens holder 15 moves together with the second linear advancement barrel 8 during zooming, the linear advancement barrel 8 and the focusing block can be constructed as one unit, which is a second characteristic feature. This improves the precision and strength of the components of the linear advancement barrel 8, leading to improvement of the optical precision of the focusing lens unit (second lens unit lenses 18).

The second characteristic has to do with the integration of the second linear advancement barrel 8 and the focusing block. In a zoom lens, the focusing lens unit needs to move along the optical axis during zooming and focusing operations. Normally, different actuators and drive mechanisms are used for the zooming and focusing operations. Accordingly, the focusing unit is often made separately from the zooming barrel and they are connected using screws, etc. Because of this, a greater number of components is employed between the fixed barrel and the focusing lens unit than is located between the fixed barrel and other zoom lens units. As a result, the focusing lens unit is more susceptible than other zoom lens units to the deterioration of the components between it and the fixed barrel, in terms of component precision, mounting precision and relationships between components. This makes it more difficult for the focusing lens unit than for other zoom lens units to have guaranteed optical precision. On the other hand, the barrel immediately outside the focusing block is often a linear advancement barrel. This linear advancement barrel has grooves and holes to accommodate the part of the focusing block where the outer diameter is larger than other parts of the focusing block—namely, a focusing motor, shutter motor, etc.—as well as linear advancement guide grooves and holes for other zoom lens units. Such a configuration gives rise to such problems of the straight advancement barrel as deterioration of component precision and lack of strength.

In consideration of these problems, the lens arrangement of the present invention has the following construction. In order to achieve the amount of movement for zooming for at least one lens unit by combining the amounts of relative movement of at least two barrels, each of two barrels of the zoom lens assembly has cams, helicoids or leads. The zoom lens assembly has a focusing lens unit, a linear advancement barrel which advances straight ahead relative to a fixed item during zooming and has linear advancement grooves to guide at least one lens unit other than the focusing lens unit, and a focusing block which supports the focusing lens unit, wherein the linear advancement barrel and focusing block support unit are formed integrally as one unit.

Figure 6:
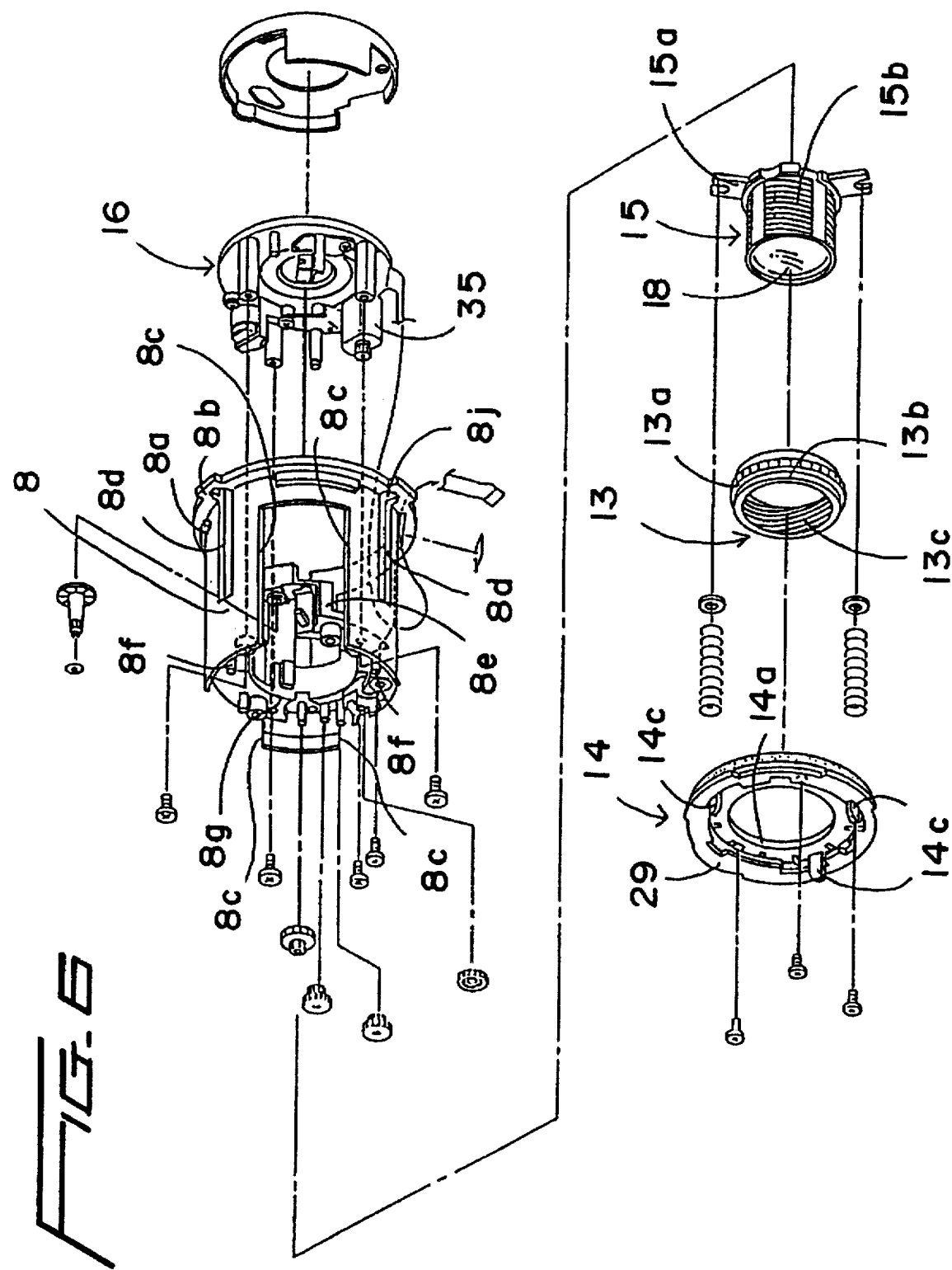
FIG. 6 is an exploded perspective view of a focusing lens supporting unit of the embodiment shown in FIG. 1.

Further explanation of this concept is provided in the context of the disclosed embodiment. In FIGS. 1, 6 and 7, as described above, the focusing lens unit comprises second lens unit lenses 18 supported by second lens unit lens holder 15, while second lens unit lens holder 15 is supported by focusing block 8e of the second linear advancement barrel 8 via female helicoid unit 13 and focusing platform 14, which is a part of the focusing mechanism. In this embodiment, since focusing block 8e is integrally constructed with the linear advancement barrel 8, the conventional deterioration in optical precision due to the deterioration in component precision, mounting precision and relationships between components, which occurs when the focusing unit is made separately from the linear advancement barrel and they are connected using screws, does not take place. As a result, second lens unit lenses 18 can be maintained without much deterioration in optical precision. In addition, because of the integral construction of focusing block 8e and the second linear advancement barrel 8, the linear advancement barrel 8 becomes seamless on the inside. Consequently, improvements in its strength and in the precision of first lens unit linear advancement guide 8c and third lens unit linear advancement guide 8d are achieved.

Figure 10:
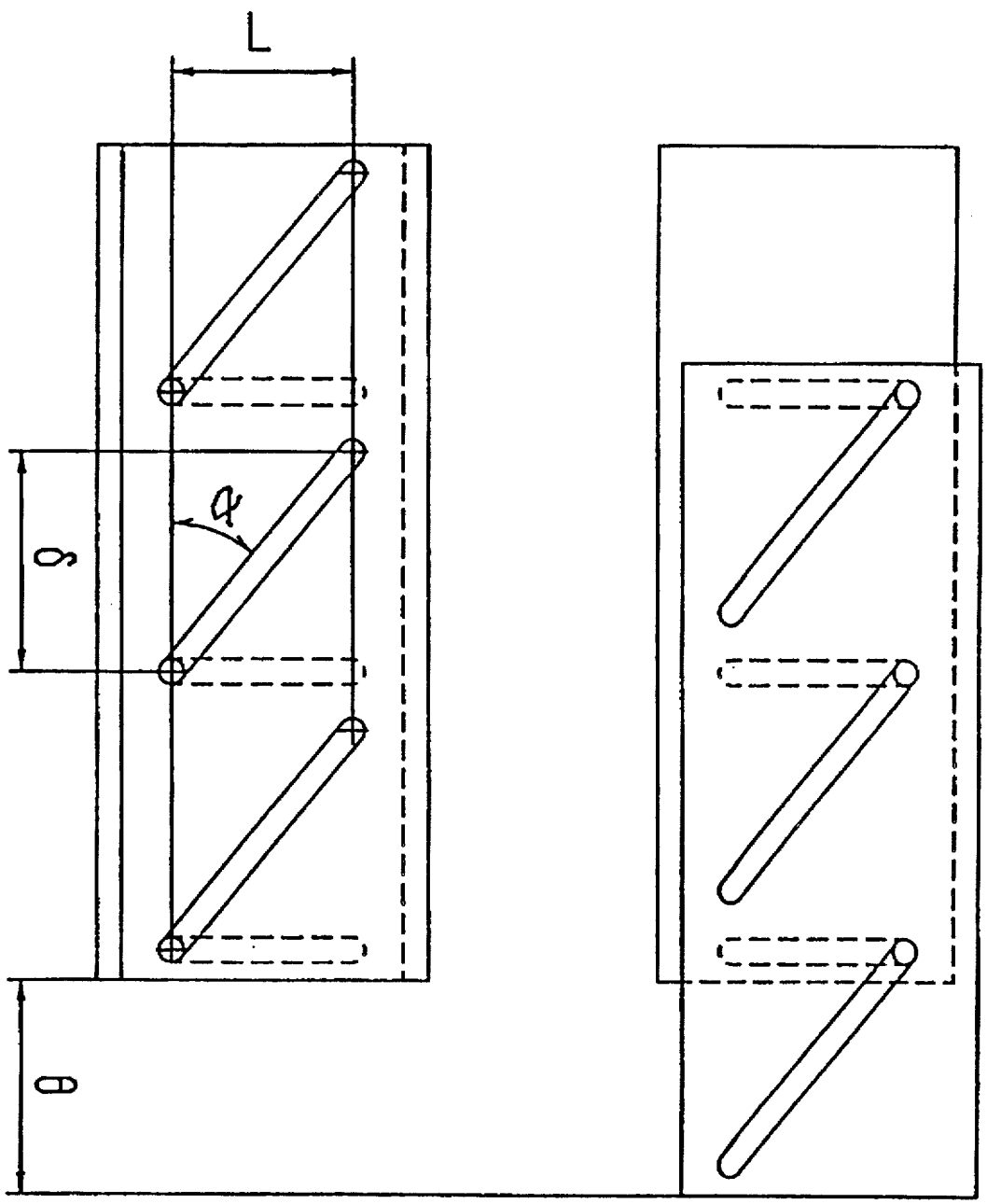
FIG. 10 is an explanatory drawing showing the operation of rotating barrels of the embodiment shown in FIG. 1.

The third characteristic has to do with the angle of rotation of the rotating barrels of the zoom lens assembly and the angle of arch, or portion of the circumference, of the barrel over which the cams extend (hereinafter called "the arch angle"). This will be explained with reference to FIGS. 10 through 16. FIG. 10 shows a zoom lens assembly in which the rotating barrels of the present invention are used. In this drawing, the lens barrels are depicted as if they were split along an axial seam and unrolled to lay flat. When the amounts of movement L of lens units are constant, if the drive torque on the zoom lens assembly is to be reduced, it is necessary to reduce the so-called pressure angle $\alpha$ of each cam. If the outer diameter of the zoom lens assembly is to be kept constant, the angle of rotation $\theta$ of each rotating barrel of the zoom lens assembly must be increased. Normally, angle of rotation $\theta$ is a relative angle of rotation between the linear advancement grooves and the cams, and in this case, angle of rotation $\theta$ is equal to each cam's arch angle $\delta$. Conventionally, the arch angle $\delta$ has been increased in order to increase the angle of rotation $\theta$ of each rotating barrel of the zoom lens assembly. However, there is a separate problem which prevents the cam's arch angle $\delta$ from being increased, for the two reasons described below.

The first reason is that when cam components are manufactured using metal molds, the increase in a cam's arch angle $\delta$ leads to a deterioration in the cam's precision of movement. To explain this in more detail, in the case of a zoom lens assembly in which the rotating barrels of the present invention are used, at least one rotating barrel and at least one non-rotating barrel, i.e., a linear advancement barrel, are needed in order to move one moving element. On one of these barrels are formed three cams, and on the other barrel are formed three linear advancement grooves. This guarantees the position of the moving element along the optical axis and its tilt relative to the optical axis at all times by virtue of continuously restricting the moving element at three points around its circumference. Thus, a reduction in the number of cams and grooves will lead to reduced precision. These three cams need to be formed on one barrel. The mold to form a barrel which has these three cams must comprise an outer cylindrical piece and at least three split inner pieces (or vice versa), and one cam is formed per split piece. To avoid a situation in which the cam walls prevent the split pieces from being removed, so-called tapered cams, the walls of which are angled relative to a direction perpendicular to the optical axis, are often used. Normally, when a cam's arch angle δ increases, this tapering angle increases. If the tapering angle increases, when the moving element is moved along the optical axis, the component force in the direction perpendicular to the optical axis (which is determined by the tapering angle) increases, and the distortion of the barrel by this component force also increases. As a result, the moving element's precision of movement declines. In the worst case, the moving element cannot operate.

It is possible to form one cam over two split mold pieces instead of forming one cam per split piece. This is true when helicoids or leads are made using a split mold. In the case of helicoids, the female and male helicoids are in surface contact—in other words, when seen from a direction perpendicular to the optical axis, they are continuously engaged with each other. Even if the split lines between split pieces are transferred to the helicoids of the barrel, they have a minimal effect on the precision along the optical axis. However, in the case of normal cams, the cam and cam follower are engaged in contact along a line—namely, when seen from a direction perpendicular to the optical axis, they are engaged with each other at a point. If the split lines between split pieces are transferred to the cam of the barrel, the movement precision of the moving element along the optical axis is greatly affected when the transferred split lines are passed. In addition, the continuity of the cam before and after the split line is lost, reducing precision in image point adjustment and background adjustment.

Naturally, a mold construction other than a split mold, e.g., a mold comprising front and rear pieces, is conceivable. This is a method in which the front part of each cam is made using the rear mold and the rear part of each cam is made using the front mold. In this case as well, to avoid having the cam walls prevent the molds from being removed, each cam's arch angle δ must be 120° or smaller.

The second reason is that when there are several cams or linear advancement grooves (for the first lens unit and third lens unit, for example) on one cam component, it is difficult to increase a cam's arch angle δ because of the component arrangement. To explain this in more detail, if the first lens unit cams and third lens unit cams are to be formed on one barrel, three cams per lens unit, or a total of six cams, must be formed on the barrel. If the outer diameter and length of the barrel are to stay unchanged, each cam's arch angle δ must be reduced. In addition, if a group of three cams and a group of three grooves are to be formed on one barrel, no cam's arch angle δ can be larger than 120° because a linear advancement groove is present at every 120° interval. The cams may not be formed over these grooves, and therefore can be formed only between the linear advancement grooves. In this case as well, as described in the explanation provided above regarding the first reason, the problem is resolved using helicoids or leads. As described above, in the case of helicoids, the male helicoids and female helicoids are in surface contact—namely, they are continuously engaged with each other when seen from the direction perpendicular to the optical axis. Even if one part of the helicoids does not engage due to a linear advancement groove, it does not create a problem because other parts of the helicoids are engaged.

As described above, if helicoids or leads are used, the arch angle δ, namely the angle of rotation θ, can be increased as much as desired without any problems while the outer diameter and length of the zoom lens assembly are maintained. Naturally, the pressure angle α of the helicoids or leads can be reduced, as well as the drive torque. However, in a practical zoom lens assembly, it is impossible to achieve the drive of multiple lens units using helicoids or leads only: cams must be used somewhere. Therefore, since the cams are restricted due to these two reasons, even if the amount of movement of each lens unit of the zoom lens assembly increases, a cam's arch angle cannot be increased in disregard of these two reasons. In other words, the pressure angle α cannot be reduced, and therefore it is difficult to prevent an increase in the drive torque without increasing the size of the zoom lens assembly.

In consideration of these problems, the present invention provides a zoom lens assembly having cams, helicoids or leads on each of at least two barrels such that the amount of movement of at least one lens unit for zooming is achieved by combining the amounts of relative movement of at least two barrels. The zoom lens assembly has a first rotating barrel and a second rotating barrel that rotate relative to a fixed item. The zoom lens assembly further includes an angle of rotation conversion means that converts the angle of rotation between a first angle of rotation, and a second angle of rotation, smaller than the first angle of rotation, while transmitting the rotational force between the first and second rotating barrels. Helicoids or leads are used for the mechanism in which movement over the first angle of rotation occurs, and cams are used for the mechanism in which movement over the second angle of rotation occurs.

Figure 11:
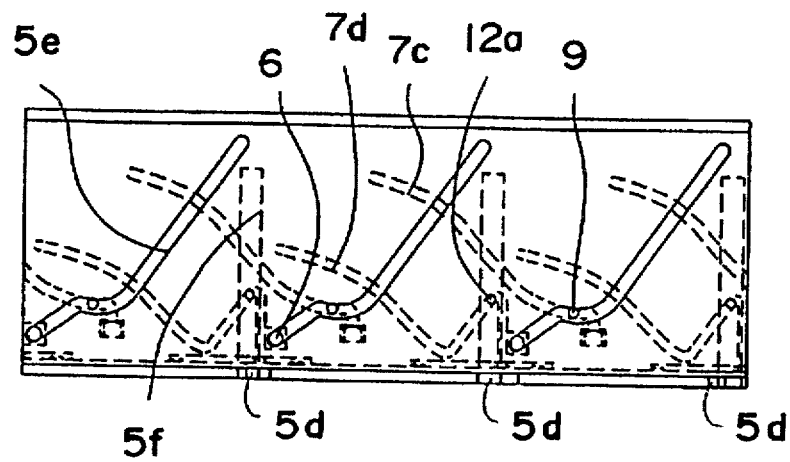
FIG. 11 is a drawing of the embodiment shown in FIG. 1 in the shortest focal length condition.
Figure 12:
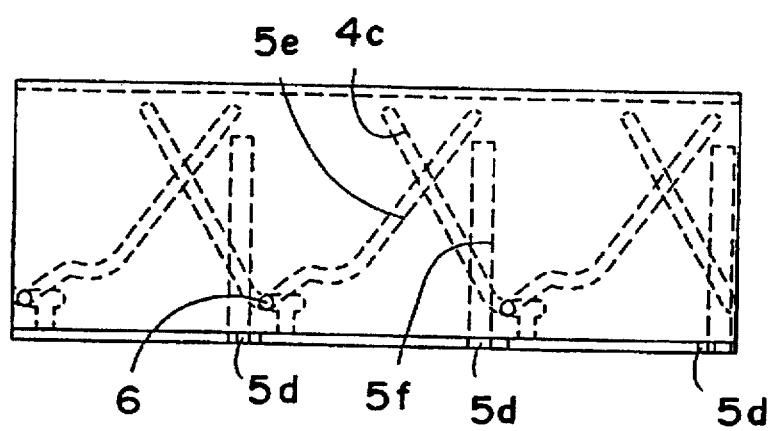
FIG. 12 is a drawing of the embodiment shown in FIG. 1 in the shortest focal length condition.
Figure 13:
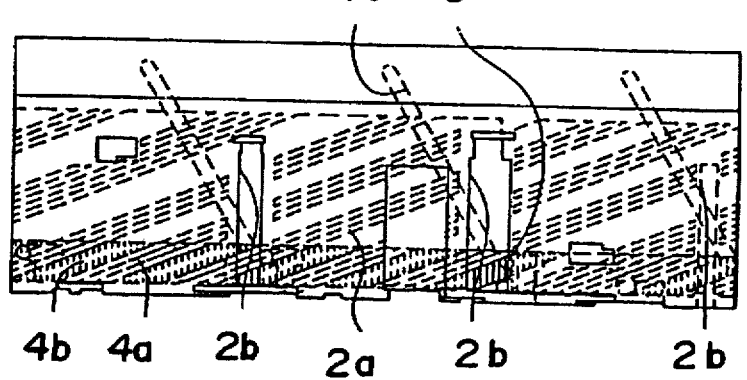
FIG. 13 is a drawing of the embodiment shown in FIG. 1 in the shortest focal length condition.
Figure 14:
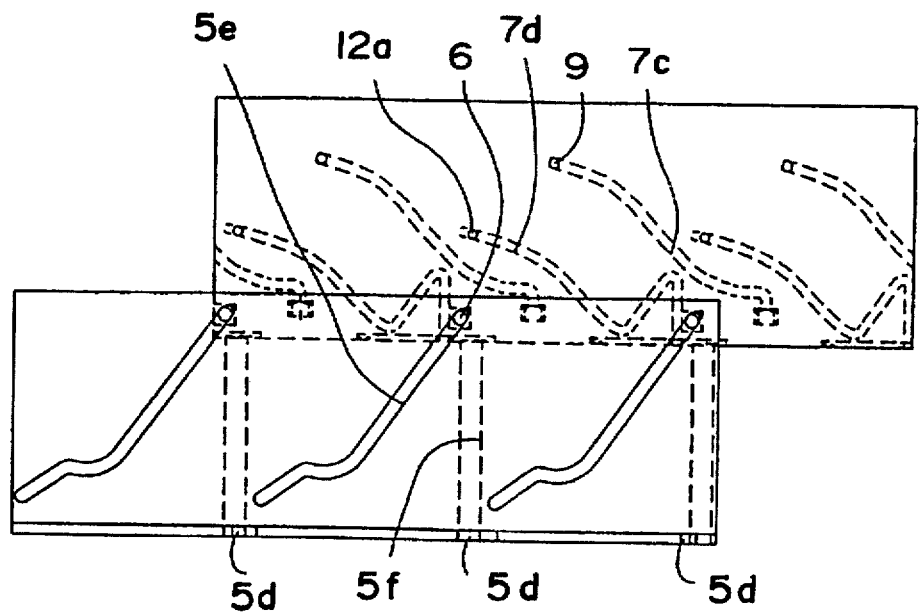
FIG. 14 is a drawing of the embodiment shown in FIG. 1 in the longest focal length condition.
Figure 15:
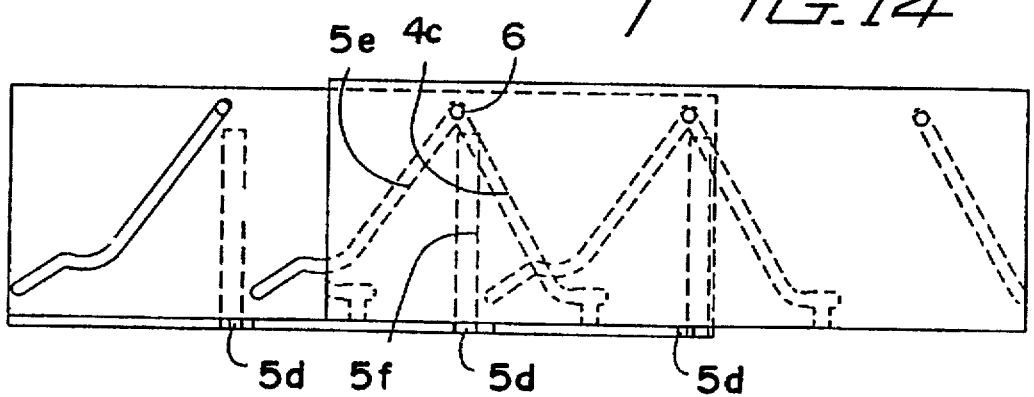
FIG. 15 is a drawing of the embodiment shown in FIG. 1 in the longest focal length condition.
Figure 16:
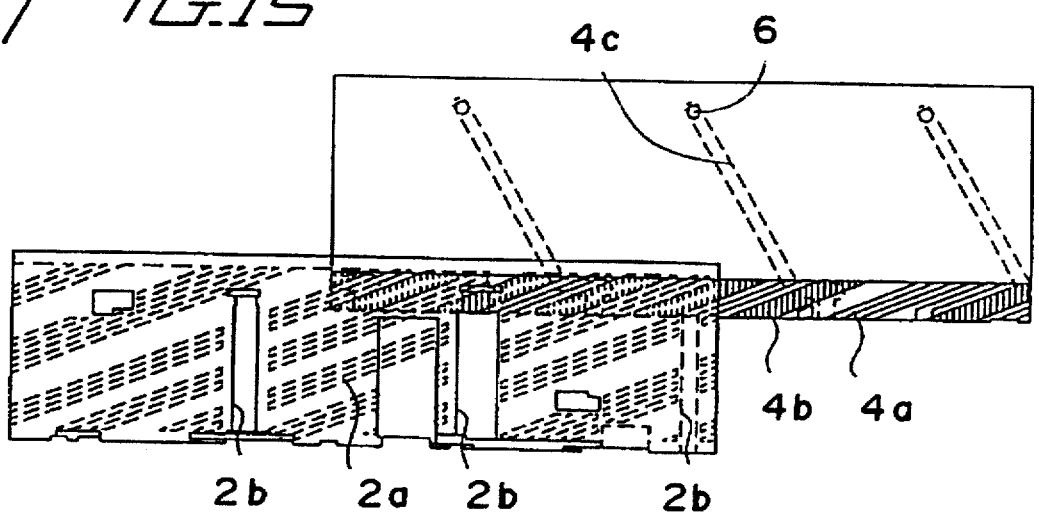
FIG. 16 is a drawing of the embodiment shown in FIG. 1 in the longest focal length condition.

A more specific explanation will be provided of this feature of the invention with reference to FIGS. 11–16. FIGS. 11 through 13 illustrate the state of the zoom lens when the camera is not being used for photo-taking (when it is being carried). FIGS. 14 through 16 illustrate the zoom lens assembly when it is in the longest focal length condition. FIGS. 13 and 16 show the relationship between fixed barrel 2 and rotating advancement barrel 4. FIGS. 12 and 15 show the relationship between rotating advancement barrel 4 and the first linear advancement barrel 5. FIGS. 11 and 14 show the relationship between the linear advancement barrel 5 and cam ring 7.

Regarding the operations to change the lens positions from the non-photo positions to the longest focal length positions, the relationship between fixed barrel 2 and rotating advancement barrel 4 is first examined. Rotating advancement barrel 4 moves from the state shown in FIG. 13 to the state shown in FIG. 16, with its male helicoids 4a engaged with female helicoids 2a of fixed barrel 2. During this movement, the angle of rotation is 160°, which is much larger than 120°, despite the fact that fixed barrel 2 has both female helicoids 2a and linear advancement grooves 2b. This is because the drive is performed using helicoids as described above, and consequently the pressure angle of the helicoids is as small as 22°.

The relationship between rotating advancement barrel 4 and the first linear advancement barrel 5 will now be examined. The linear advancement barrel 5 is assembled as one unit with rotating advancement barrel 4 along the optical axis as described above, and advances straight ahead relative to fixed barrel 2. Therefore, the relationship between rotating advancement barrel 4 and linear advancement barrel 5 changes from the state shown in FIG. 12 to the state shown in FIG. 15. Here, first cam followers 6 fixed to cam ring 7 move while engaging with tapered cams 4c of rotating advancement barrel 4 and cam holes 5e of the first linear advancement barrel 5, as described above. Since tapered cams 4c of rotating advancement barrel 4 are not linear advancement grooves but have a pressure angle opposite the direction of the pressure angle of cam holes 5e of linear advancement barrel 5, the entire angle of rotation of rotating advancement barrel 4 is not transmitted to cam followers 6; only an angle of rotation less the arch angle of tapered cam 4c of rotating advancement barrel 4, i.e., the angle of rotation equivalent to the arch angle of cam holes 5e of linear advancement barrel 5, is transmitted after being converted. This ultimately results in dividing the arch angle of female helicoids 2a of fixed barrel 2, i.e., the angle of rotation of rotating advancement barrel 4, in half, whereby the arch angle of each cam of rotating advancement barrel 4 and the linear advancement barrel 5 becomes smaller, making the manufacture of the barrels easier. With regard to the drive torque on first cam followers 6 engaged with tapered cams 4c of rotating advancement barrel 4 and cam holes 5e of the linear advancement barrel 5, although the pressure angle of each cam appears to be larger, the drive torque is approximately the same as that needed for the conventional combination of cams and linear advancement grooves, so long as the angle of rotation is the same as that of the combination. In the case of this embodiment, the drive torque is the same as that for the combination of fixed barrel 2 and rotating advancement barrel 4. In this embodiment, because each of the tapered cams 4c of rotating advancement barrel 4 extends over a 60 degree arch of the barrel and each of cam hole 5e of the linear advancement barrel 5 extends over a 100° arch, first cam followers 6, i.e., cam ring 7, rotate 100°.

Finally, the relationship between cam ring 7 and the second linear advancement barrel 8 will be described. Incidentally, the second linear advancement barrel 8 is omitted in FIGS. 11 through 14.

Since the linear advancement barrel 8 is assembled as one unit with cam ring 7 along the optical axis, as described above, it advances straight ahead relative to fixed barrel 2, and cam followers 9 fixed to first lens unit lens barrel 10 and cam followers 12a of third lens unit lens holder 12 move from the state shown in FIG. 11 to the state shown in FIG. 14 while being engaged with first lens unit tapered cams 7c and third lens unit tapered cams 7d of cam ring 7 and first lens unit linear advancement guides 8c and third lens unit linear advancement guides 8d of the second linear advancement barrel 8, respectively. During this process, since linear advancement grooves exist on the side of the linear advancement barrel 8, the angle of arch over which each cam of cam ring 7 extends should be as large as the angle of rotation of cam ring 7, in other words, the smaller arch angle of cam holes 5e of the first linear straight advancement barrel 5, and not the larger arch angle of female helicoids 2a of fixed barrel 2. Therefore, in this embodiment, each cam of cam ring 7 extends over a 100° arch of the cam ring. In this way, the angle of rotation can be increased in fixed barrel 2 in which helicoids may be used while the angle of rotation can be reduced in cam ring 7, on which it is difficult to arrange cams, in order to reduce the angle of arch over which the cams are disposed.

Using this construction, the drive torque can be reduced without deterioration in the movement precision of lens units or an increase in size due to the difficulty with the cam arrangement.

The fourth characteristic of the invention is the construction of the third lens unit lens holder 12. In a zoom lens assembly used in a camera that is not a single reflex camera, the lens which is closest to the film (third lens unit rear lens 32 in the illustrated embodiment) has a short lens back when it is at the shortest focal length position. Because of this, its effective aperture increases and its outer diameter is larger than other lenses. A conventional example of such a situation is explained with reference to FIG. 9. In FIG. 9, regarding lens 132 closest to the film, front end surface 132a and diametral engaging member 132b engage with contact surface 112b and rear engaging member 112c of lens holder 112, respectively, and the fixing of the lens is carried out via lens fixing member 112a of lens holder 112 surrounding the lens. As a result of this construction, the largest outer diameter of lens holder 112 is obtained by adding the thickness of the lens holder to the largest outer diameter of the lens, considering the effective aperture. Naturally, it is necessary to make the inner diameter of the barrel immediately outside the lens holder larger than the largest outer diameter of the lens holder, which significantly hinders the zoom lens assembly from becoming compact. In addition, in a three component-type zoom lens, the lens closest to the object usually has a large effective aperture in the shortest focal length condition as well. As in the case of the lens closest to the film, the largest outer diameter of the lens holder becomes as large as the largest outer diameter of the lens, considering the effective aperture, plus the thickness of the lens holder. It is also necessary to make the inner diameter of the barrel immediately outside the lens holder larger than the largest outer diameter of the lens holder, as in the case of the lens closest to the film, which also significantly prevents the zoom lens assembly from becoming compact.

In consideration of this problem, and in order to resolve it, the zoom lens assembly is provided with the construction described below in accordance with another aspect of the invention. In a zoom lens assembly of a camera which is not a single lens reflex camera, regarding the lens closest to the film (or the lens closest to the object), a notch is formed in an area having a diameter smaller than the largest diameter determined by the effective aperture of the lens, such that the notch is perpendicular to the optical axis. A lens holder is employed which does not surround the lens around the area of its largest diameter, determined by the effective aperture of the lens, but which supports the lens at points at which the lens has a diameter the same as or smaller than its largest diameter. Further, the end surface of the lens holder is placed such that it is close to the notch of the lens, and an adhesive is applied between the notch of the lens and the end surface of the lens holder such that the lens may be affixed to the lens holder.

Figures 8, 9:
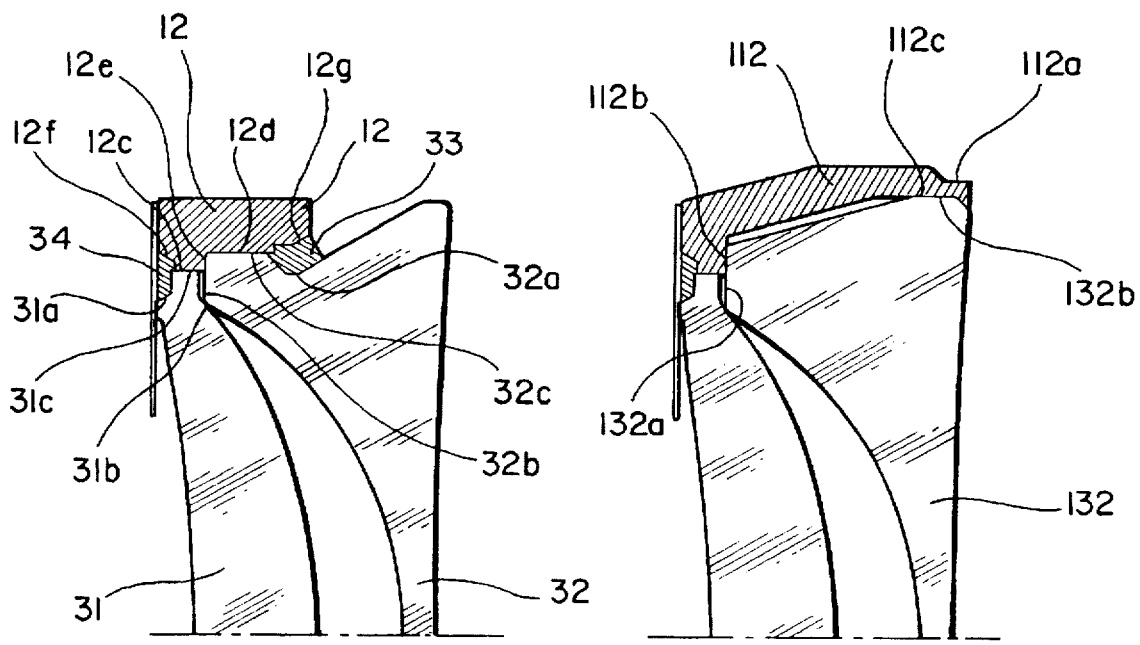
FIG. 8 is a sectional side elevation of a lens holder of the embodiment shown in FIG. 1.
FIG. 9 is a sectional side elevation showing a conventional lens holder.

A more specific explanation of this feature is provided with reference to FIG. 8. In FIG. 8, third lens unit rear lens 32, which is the lens closest to the film, is positioned along the optical axis by front end surface 32b coming into contact with contact surface 12e of third lens unit lens holder 12, as in the case of the conventional example. In order for the outer diameter of the lens holder not to become larger than the lens' largest diameter, considering the effective aperture, as shown in FIG. 8, the lens is positioned in the direction of its diameter, via engaging member 32c of third lens unit rear lens 32. This engaging member is formed at a point of the lens having a diameter smaller than the largest diameter determined by the effective aperture of third lens unit rear lens 32, and engages rear engaging member 12d of third lens unit lens holder 12. Because adhesion takes place using an area where the lens' diameter is smaller than its largest diameter, as shown in the drawing, adhesive 33 is applied between notch 32a of third lens unit rear lens 32 and adhesion member 12g of third lens unit lens holder 12. Where the lens is fixed using an adhesive, the strength of adhesion between the lens and the adhesive is often a problem. In this embodiment, however, as shown in FIG. 8, notch 32a is formed such that the lens is configured to have a concave area and is not easily disengaged along the optical axis, and the adhesive is applied in the notch. By using this configuration, the strength of adhesion between the lens and the adhesive increases, which makes it possible to prevent the lens from being disengaged on impact.

The fifth characteristic of the invention has to do with the engagement between the second linear advancement barrel 8 and the third lens unit lens holder 12. This will be explained with reference to FIGS. 1 through 3 and FIG. 5, as well as FIG. 17, which is an enlargement of the second linear advancement barrel 8 and the third lens unit lens holder 12. FIG. 17(a) is a front elevation of third lens unit lens holder 12 as seen from the side of the photographic object, FIG. 17(b) is a plan view as seen from above the camera, FIG. 17(c) is a side elevation as seen from the side of the camera, and FIG. 17(d) is a rear view of the second linear advancement barrel 8 as seen from the side of the film. In FIG. 17, as described above, 12a and 12b are a cam follower and a linear advancement key, respectively. The elements 31 and 32 are a third lens unit front lens and a third lens unit rear lens, respectively. Elements 8b and 8i are a linear advancement rib and a third lens unit lens holder receiver. Element 12h is a linear advancement key reinforcement, element 12i is a deformation preventing contact surface, element 8h is a third lens unit lens holder linear advancement key receiver, and element 8j is a third lens unit lens holder escape path.

In FIGS. 1 through 7, as described above, focusing block 8e is integrally formed with the second linear advancement barrel 8 in this embodiment in order to reduce the number of cams on cam ring 7. To make the zoom lens assembly more compact, it is constructed such that the space behind shutter unit 16 in linear advancement barrel 8 is smaller in length along the optical axis than the amount of movement of third lens unit lens holder 12 relative to linear advancement barrel 8. As a result, when third lens unit lens holder 12 moves along the optical axis to the furthest rear position relative to linear advancement barrel 8, i.e., when the camera is in the shortest focal length condition shown in FIG. 2, third lens unit lens holder 12 protrudes from the rear end of linear advancement barrel 8 along the optical axis. In this embodiment, however, as shown in FIGS. 1 through 3 and FIGS. 5 and 17, third lens unit lens holder 12 is supported such that it remains connected to linear advancement barrel 8 by extending third lens unit lens holder 12 toward the front along the optical axis and by placing cam followers 12a at its tip. So that the extended parts of third lens unit lens holder 12 do not take up space in the diametral direction, the extended parts are placed inside third lens unit linear advancement guides 8d of the linear advancement barrel 8. Therefore, because the extended parts of third lens unit lens holder 12 are formed to have only the thickness and width of third lens unit linear advancement guide 8d of linear advancement barrel 8, lack in strength, particularly the disengagement of cam followers 12a of third lens unit lens holder 12 from third lens unit tapered cams 7d of cam ring 7 caused by diametral deformation, is a problem.

To resolve this problem, a zoom lens assembly in accordance with the present invention is provided with the construction described below. To prevent the disengagement of cam followers 12a of third lens unit lens holder 12 from third lens unit tapered cams 7d of cam ring 7, third lens unit lens holder linear advancement key receivers 8h, which have a height identical to or smaller than third lens unit linear advancement guides 8d, are formed on the second linear advancement barrel 8. At the same time, deformation preventing contact surfaces 12i come into contact with third lens unit lens holder linear advancement key receivers 8h of the linear advancement barrel 8 when the linear advancement keys 12b are deformed. Linear advancement key reinforcements 12h, to form deformation preventing contact surface 12i, are formed on third lens unit lens holder 12, such that they do not exceed the height of third lens unit linear advancement guides 8d. Formed on linear advancement barrel 8 are third lens unit lens holder receivers 8i, which can receive third lens unit lens holder 12 on its circumference if linear advancement keys 12b, the extended parts of third lens unit lens holder 12, become deformed when third lens unit lens holder 12 moves to the furthest rear position along the optical axis relative to the linear advancement barrel 8, i.e., when the camera is in the shortest focal length condition shown in FIG. 2. Incidentally, third lens unit lens holder receivers 8i of linear advancement barrel 8 are extensions of parts of the linear advancement barrel 8 along the optical axis such that the lens assembly does not interfere with other components when photographs are not being taken, that is, when the camera is being carried.

A description will now be given of the manner in which the third lens unit lens holder 12 is assembled into the second linear advancement barrel 8. The third lens unit lens holder escape paths 8j have a configuration almost identical to cam follower 12a, linear advancement key 12b and linear advancement key reinforcement 12h, as seen from the direction of the optical axis. These escape paths are constructed on the flange located at the furthest rear end of the linear advancement barrel 8 along the optical axis. So that third lens unit lens holder 12 can be assembled into the linear advancement barrel 8 from the rear end along the optical axis. Third lens unit lens holder escape paths 8j of linear advancement barrel 8 are located near linear advancement ribs 8b as seen in FIG. 17(d), a rear elevation of linear advancement barrel 8 seen from the side of the film, which prevents third lens unit lens holder escape paths 8j from entirely removing parts of the flange at the furthest rear end of linear advancement barrel 8 along the optical axis. Using this construction, the insufficiency in strength of third lens unit lens holder 12 is eliminated and the zoom lens assembly can be made compact.

Figure 18A:
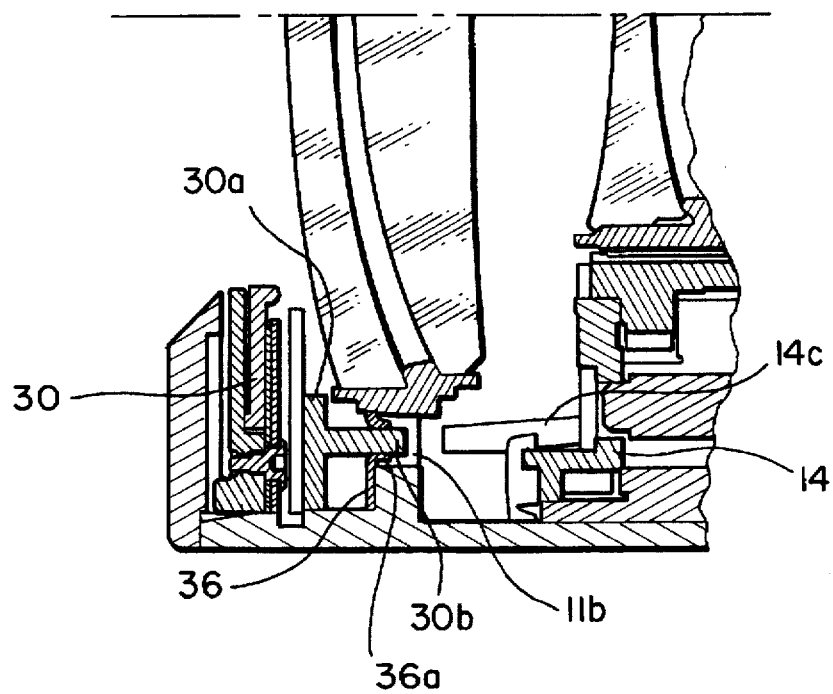
FIGS. 18a–c are a sectional side elevation, a plan view, and a sectional side elevation of a shielding sheet, respectively, of a barrier mechanism of the embodiment shown in FIG. 1.
Figures 18B, 18C:
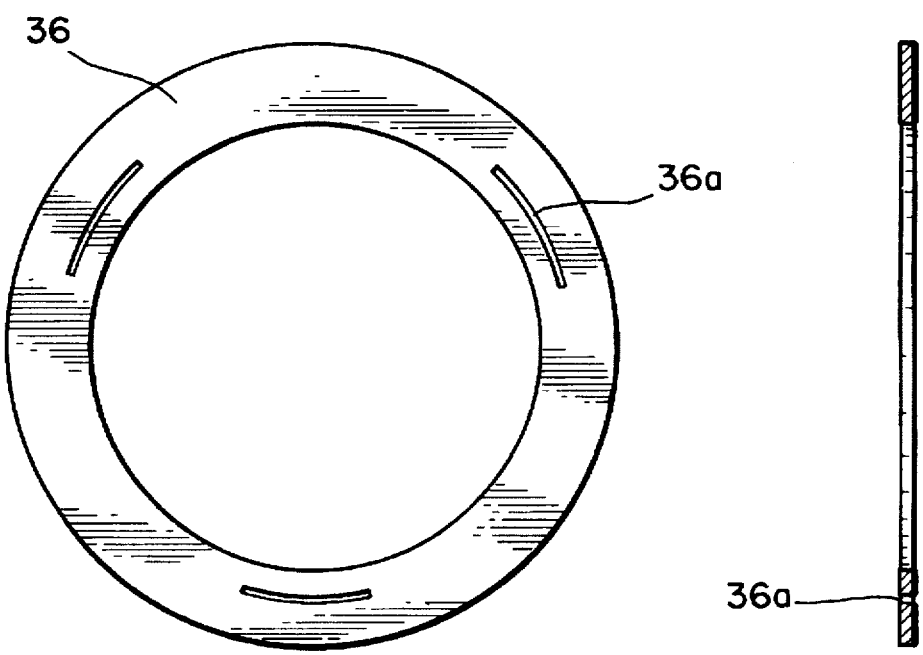

The sixth characteristic feature of the invention has to do with the linkage between the zoom mechanism and the barrier open/close mechanism. In this embodiment, the change in relative positions of first lens unit lens barrel 10 and the second linear advancement barrel 8 between the times when the zoom lens assembly is in the non-phototaking status, or namely when the camera is being carried, and when the camera is operating in the shortest focal length condition, is converted into rotational force and the barrier is opened or closed based on the rotational force using a public-domain barrier open/close mechanism. A more detailed explanation will be given with reference to FIGS. 1 through 3 and FIGS. 5, 6 and 18. FIG. 18(a) is an enlargement of the barrier open/close mechanism. A ring cam 30b is integrally connected to barrier operating ring 30a of barrier unit 30. There are three such ring cams. FIG. 18(b) is a front elevation of rubber shielding sheet 36 and FIG. 18(c) is a cross-sectional view thereof, showing cuts 36a for the cams.

In this embodiment, as described above, barrier unit 30 is linked to first lens unit lens barrel 10 while focusing platform 14 equipped with barrier drive cams 14c is linked to the second linear advancement barrel 8. Since first lens unit lens barrel 10 is guided to advance straight ahead by first lens unit linear advancement guides 8c of the linear advancement barrel 8, first lens unit lens barrel 10 and linear advancement barrel 8 do not rotate relative to each other but advance straight ahead when the zoom lens assembly is changed from the non-photo-taking state, or when the camera is being carried, to the shortest focal length state. Therefore, when the zoom lens assembly is changed from the non-phototaking state, or when the camera is being carried, to the shortest focal length state, barrier drive cams 14c of focusing platform 14, which advances straight ahead relative to barrier unit 30, come into contact with and then separate from ring cams 30b of barrier unit 30. This causes barrier operating ring 30a of barrier unit 30 to rotate, and this rotational force causes the barrier to open and close. Such linkage between the zoom mechanism and the barrier open/close mechanism has conventionally been available in the market. However, the conventional version has only one cam equivalent to the barrier drive cams 14c and ring cams 30b, respectively, and this pair of cams is used to rotate a member equivalent to the barrier operating rings 30a. As a result, an unnecessary moment of force other than the rotational force is exerted on the ring, resulting in an increase in the zoom lens assembly drive torque necessary to open and close the barrier, and consequent barrier malfunction.

The zoom lens assembly of the present invention is provided with the construction described below to resolve this problem. Multiple ring cams 30b angled away from the optical axis are located on barrier operating ring 30a of barrier unit 30. Barrier drive cams 14c of focusing platform 14, which match the number of ring cams 30b, are placed at positions to face and engage the ring cams, such that they cause barrier operating ring 30a of barrier unit 30 to rotate. This embodiment includes first lens unit lens holder 11 between barrier unit 30 and focusing platform 14. In order for barrier drive cams 14c of focusing platform 14 and ring cams 30b of barrier unit 30 to come into contact when the barrier is opened or closed, first lens unit lens holder 11 has escape holes 11b.

In addition, in order to prevent light or dust from unnecessarily entering the zoom lens assembly from escape holes 11b of first lens unit lens holder 11, rubber shielding sheet 36 having cuts 36a which are of the smallest size that allows barrier drive cams 14c and ring cams 30b to come into contact when the barrier is operated, and which match the number of ring cams 30b, is inserted between first lens unit lens holder 11 and barrier unit 30. Barrier drive cams 14c and ring cams 30b come into contact while they are pressed into these cuts 36a. Using this construction, any unnecessary moment of force other than the rotational force is applied to the ring at multiple points, and the moments from each point cancel out one another, preventing an increase in assembly lens drive torque to open and close the barrier and consequent barrier malfunction. This construction also prevents light and dust from unnecessarily entering the zoom lens assembly.

Figure 19:
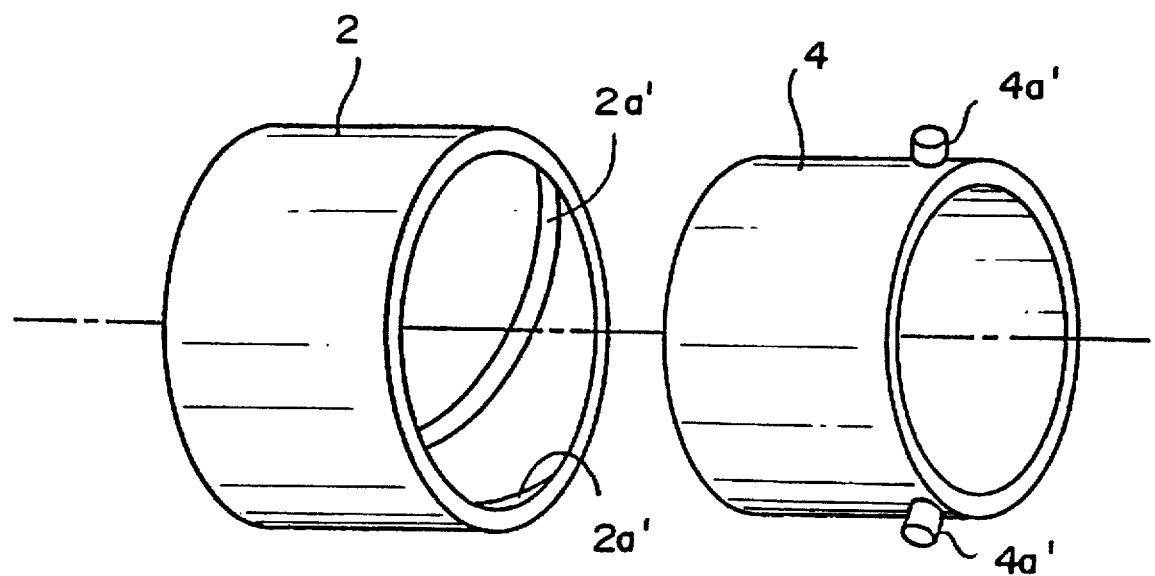
FIG. 19 is a perspective view of an alternate embodiment of the fixed barrel and the rotating barrel.
Figure 20:
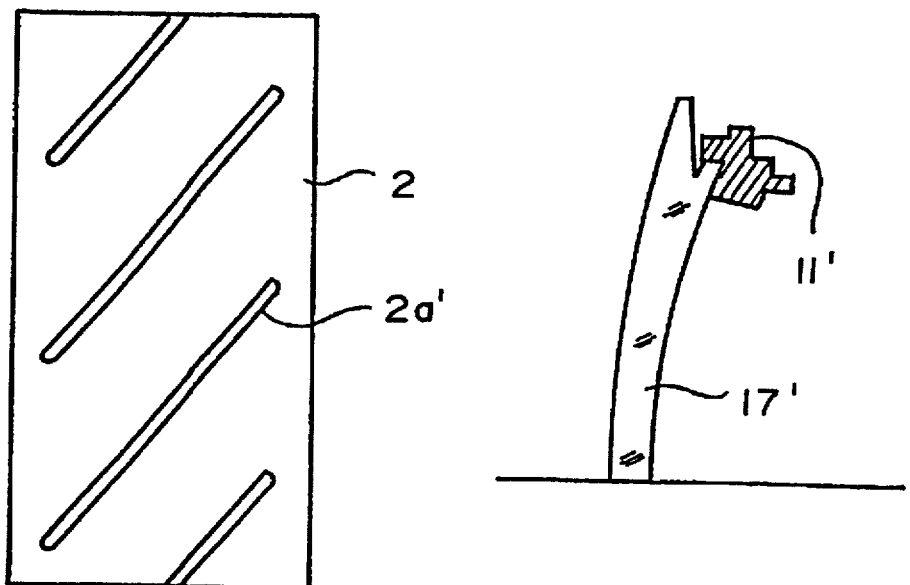
FIG. 20 is a plan view of the interior of the fixed barrel.

FIG. 19 shows a modification of the fixed barrel 2 and the barrel 4. The modified fixed barrel 2 includes three lead grooves 2a' on the inner periphery thereof. The modified barrel 4' includes three follower pins on the outer periphery thereof. The interior construction of the fixed barrel 2 is shown in FIG. 20. As shown in the drawing, the lead grooves 2a' have uniform inclination.

Figure 21:
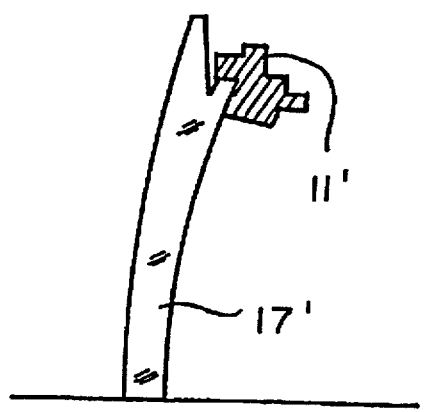
FIG. 21 is a side view of an alternate embodiment of the first lens unit.

FIG. 21 shows a modification of the first lens unit 17 and the first lens unit holder 11. In the modification, the first lens unit 17' has an outer circumference larger than that of the first lens holder 11'.

By applying the features of the present invention, a three component-type zoom lens assembly can be attained using a cam ring outer diameter and length of the dimensions used in a two component-type zoom lens assembly, making the zoom lens assembly compact.

It will be appreciated by those of ordinary skill in the art that the present invention cna be embodied in other forms without departing from the spirit or essential characteristics thereof. The presently disclosed embodiment is consdiered in all respects to be illustrative and not restrictive. The scope of the invention is indicated by the appended claims, rather than the foregoing description, and all changes which come within the meaning and range of equivalents thereof are intended to be embraced therein.

What is claimed is:

1. A lens assembly comprising:

a first lens barrel which moves in the direction of an optical axis of the lens assembly;

first, second and third lens units which are arranged relative to one another such that said first lens unit is located closest to an object, said third lens unit is located closest to an image of the object that is formed by said lens assembly, and said second lens unit is located intermediate said first and third lens units and moves together with said first lens barrel;

a second lens barrel which moves together with said first lens barrel along the optical axis, and moves relative to said first lens barrel around the optical axis;

a first cam provided in said second lens barrel for moving said first lens unit; and a second cam provided in said second lens barrel for moving said third lens unit.

2. A lens assembly as claimed in claim 1 further comprising a focusing mechanism which is integrally supported on said first lens unit.

3. A lens assembly comprising:

an optical lens; and a lens holder which holds said optical lens therein, wherein the outer periphery of said optical lens is larger than that of said lens holder and has an undercut portion, and said optical lens and said lens holder are fixed by an adhesive disposed in a gap between said undercut portion and said lens holder.

4. A lens assembly as claimed in claim 3, wherein said optical lens is insertable into said lens holder from an image side of said lens assembly.

5. A lens assembly as claimed in claim 3 comprising at least first and second optical lenses, wherein said first optical lens is the optical lens having an outer periphery which is larger than that of said lens holder and is positioned at the forward, light-receiving side of said lens assembly.

6. A lens assembly as claimed in claim 3 comprising at least first and second optical lenses, wherein said first optical lens is the optical lens having an outer periphery which is larger than that of said lens holder and is positioned at the rear, light-emitting side of said lens assembly.

7. A lens assembly comprising:

a fixed lens barrel;

a first movable lens barrel which is supported inside said fixed lens barrel and is rotated around an optical axis of said lens assembly;

a second movable lens barrel which is supported inside said first movable lens barrel and is rotated around the optical axis at a rotational speed which is slower than that of said first movable lens barrel; and a transmission mechanism which is provided between said first and second movable lens barrels to vary the rotational speed while transmitting rotational movement between said two movable lens barrels.

8. A lens assembly as claimed in claim 7, wherein said first movable lens barrel consists of one drive mechanism for moving a component of said lens assembly.

9. A lens assembly as claimed in claim 8, wherein said drive mechanism includes one set of lens forwarding structure.

10. A lens assembly as claimed in claim 7, wherein said second movable lens barrel includes two drive mechanisms for moving components of said lens assembly.

11. A lens assembly as claimed in claim 7, wherein said first movable lens barrel is rotated by a drive mechanism having a lead portion which determines a linear advance ratio for said first movable lens barrel.

12. A lens assembly as claimed in claim 11, wherein said lead portion includes a helicoid.

13. A lens assembly as claimed in claim 11, wherein said lead portion includes a lead groove.

14. A lens assembly as claimed in claim 7, wherein said second movable lens barrel is rotated by a drive mechanism which has a cam portion.

15. A lens assembly as claimed in claim 7 further comprising:
   a third movable lens barrel which moves along the optical axis together with said first lens barrel;
   a first cam portion provided in said first movable lens barrel; and
   a second cam portion provided in said third movable lens barrel, wherein said transmission mechanism includes said first and second cam portions.

16. A lens assembly as claimed in claim 15, wherein said first cam portion has an inclination which is opposite to that of said second cam portion.

17. A lens assembly having an optical lens and a lens holder which holds the optical lens, said optical lens comprising:
   a first outer periphery;
   a second outer periphery having a diameter larger than that of said first outer periphery; and
   a connecting portion which connects said first and second outer peripheries and has an undercut shape;
   wherein said optical lens is held by said lens holder at said first outer periphery.

18. A lens assembly as claimed in claim 17, wherein said optical lens is insertable into said lens holder from an image side of said lens assembly.

19. A lens assembly as claimed in claim 17, comprising at least first and second lenses in order from the object side of said lens assembly, wherein the first lens is said optical lens and its second outer periphery is positioned closer to the object side of said lens assembly than the first outer periphery.

20. A lens assembly as claimed in claim 17, comprising at least first and second lenses in order from the object side of said lens assembly, wherein the second lens is said optical lens and its second outer periphery is positioned farther from the object side of said lens assembly than the first outer periphery.

* * * * *